Figure 1:
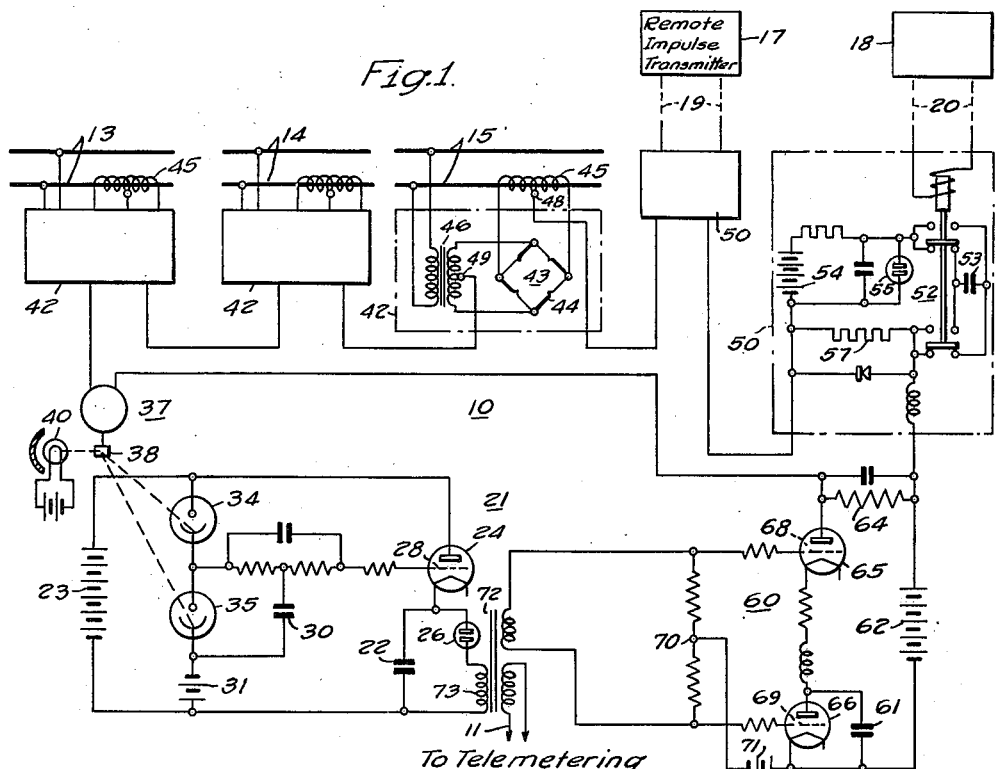

Feb. 5, 1946.                    C. OMAN                    2,394,096
                              METERING SYSTEM
                           Filed Feb. 13, 1945

WITNESSES:                                               INVENTOR
E. A. McCloskey.                                         Carl Oman.
F. V. Giolma                                             BY G. M. Crawford
                                                            ATTORNEY Patented Feb. 5, 1946

2,394,096

UNITED STATES PATENT OFFICE 2,394,096

METERING SYSTEM

Carl Oman, Cedar Grove, N. J., assignor to Westinghouse Electric Corporation, East Pittsburgh, Pa., a corporation of Pennsylvania Application February 13, 1945, Serial No. 577,678

10 Claims. (Cl. 177—351)

My invention relates, generally, to remote metering systems and has reference in particular to totalizing telemetering systems.

Generally stated, it is an object of my invention to provide an improved totalizing telemetering system that is simple and inexpensive to manufacture and is accurate and reliable in operation.

More specifically, it is an object of my invention to provide for totalizing indications of electrical quantities from a number of electrical circuits and for converting the totalized indication into an impulse rate proportional to the totalized indication.

It is also an object of my invention to provide for controlling an oscillator in a telemetering repeater in accordance with the totalized indications of impulses received from a number of impulse telemetering circuits.

A further object of my invention is to provide for controlling the frequency of a repeater oscillator in a remote metering system in accordance with the differential between the totalized indications received from a number of remote telemetering systems, and an output indication of the oscillator which is proportional to the frequency thereof.

Still another object of my invention is to provide for varying the frequency of oscillation of a telemetering repeater oscillator in accordance with the differential between its output frequency and the effective frequency produced by the totalization of impulses from a plurality of telemetering circuits.

Yet another object of my invention is to provide for generating impulses in a telemetering repeater having a frequency which is proportional to the totalized indications from a plurality of stations.

It is also an object of my invention to provide for controlling the frequency of an impulse oscillator at a telemetering repeater station with a minimum of deviation due to calibration of the control apparatus and circuits.

Still another object of the invention is to provide for controlling the frequency of a telemetering repeater oscillator in accordance with the differential between a control voltage proportional to the totalized indications of power, current, or other electrical quantity received by the repeater from remote sources, and a control voltage proportional to the frequency of the oscillator.

Other objects will in part be obvious, and will in part be explained hereinafter.

In accordance with my invention, impulse filters are used to produce control voltages at a repeater station in a telemetering system which are proportional to the individual impulse rates of each of a plurality of remotely located impulse transmitting meter devices. Thermal devices are used to produce voltages which are indications of the power, current or other electrical quantity of one or more local circuits. A repeater oscillator is provided for producing impulses at a rate which is proportional to the totalized indications of the devices. To obtain this result, the frequency of the oscillator is controlled by applying thereto a control voltage, which is the differential between the totalized sum of the control voltages from the remote device impulse filters and the local thermal devices, and a control voltage from a local impulse filter which is proportional to the frequency of the repeater oscillator.

Figure 2:
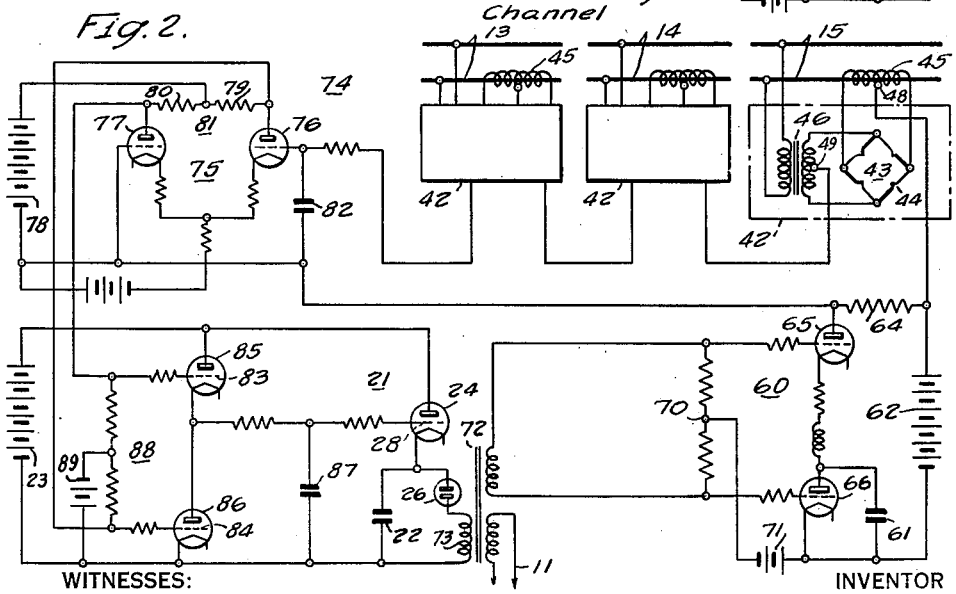

For a more complete understanding of the nature and scope of my invention, reference may be made to the following detailed description which may be studied in connection with the accompanying drawing in which, Figure 1 is a diagrammatic view of a telemetering repeater embodying the invention in one of its forms, and Fig. 2 is a diagrammatic view of a telemetering repeater embodying the invention in another of its forms.

Referring to Figure 1, the reference numeral 10 may denote, generally, a telemetering repeater for transmitting to a telemetering channel, represented by the conductors 11, a totalized indication of the power, current or other electrical quantity of one or more local control circuits denoted, generally, by the pairs of conductors 13, 14 and 15, as well as that of one or more remote sources which may be provided with remote impulse transmitters 17 and 18 of any suitable type well known in the art for transmitting over telemetering channels, indicated by dotted conductors 19 and 20, impulse indications representative of the desired quantities in the remote circuits.

The repeater 10 may comprise, generally, an oscillator 21 including a condenser 22 disposed to be charged from a suitable source of direct current, such as the battery 23, through a control valve 24 and discharged through a valve 26, which may be of the glow-discharge type. The frequency of the oscillator may be controlled by determining the rate of charge of the capacitor 22, which is dependent on the conductivity of the valve 24. Control of the conductivity of the valve 24 may be effected by varying the potential of a condenser 30 which may be connected in the control electrode circuit in series circuit relation with a suitable source of negative bias voltage, such as the battery 31.

The potential on the condenser 30 may be varied by controlling the charge thereof by means of a pair of photosensitive devices 34 and 35, which may be connected in series circuit relation and shunt circuit relation, respectively, with the condenser 30. The conductivity of the photosensitive devices may be varied in any suitable manner, such as by means of a galvanometer device 37 which may be provided with a mirror 38 for varying the amount of illumination on the photosensitive devices 34 and 35 from a source, such as the lamp 40, and thus changing the charge on the condenser from a given value which may exist when the illumination of the devices is balanced.

In order to provide for controlling the frequency of the oscillator through operation of the galvanometer device 37, suitable means may be provided for producing unidirectional control voltages which are proportional to the power or other electrical quantity of the circuits of which an indication is desired. For example, means such as the thermal converters 42 may be provided in connection with each of the local sources represented by the pairs of conductors 13, 14 and 15. The thermal converters may be of a type well known in the art, such as are described in detail in Patent No. 2,283,566, which issued on May 19, 1942, to John H. Miller.

The thermal converters may comprise bridge circuits 43 of thermocouple devices 44 of which the opposite terminals may be connected across current and potential transformers 45 and 46, respectively, associated with the local sources. The outputs of the converters may be taken from center taps 48 and 49 on the current and voltage transformers, respectively, and will be found to be proportional to the rates of power flow in the associated local circuit. By connecting the outputs of the thermal converters additively in series circuit relation, a control voltage may be obtained which is proportional to the totalized power flow in all the local circuits.

A totalized indication of the power flow at the remote sources associated with the impulse transmitters 17 and 18 may be effected by connecting impulse filters 50 to the telemetering channels 19 and 20 for producing unidirectional control potentials which are proportional to the frequency of impulses transmitted over the channels. For example, the impulse filters 50 may comprise a filter of the type which is clearly described and explained in my prior Patent No. 2,078,680, which issued on April 27, 1937, and is assigned to the assignee of the present invention.

The filters may, for example, comprise reversing relays 52 which periodically connect a storage condenser 53 so as to be charged from a source of direct current such as the battery 54, and discharged each time an impulse is received. Means such as the glow-discharge valve 55 is provided for regulating the voltage applied to the condenser 53 so as to insure the rate of charge and the amount of charge thereon being uniform. Accordingly, a voltage is produced across the control resistor 57 which will be proportional to the rate of charge and discharge of the condenser 53, which is, in turn, dependent on the frequency of the impulses received. By connecting the control resistors 57 in series circuit relation with the outputs of the thermal converters 42, a single control voltage is obtained which is substantially proportional to the totalized power flow of the circuits.

In order to control the frequency of the oscillator and make it independent of the galvanometer calibration, as well as proportional to the totalized rates of power flow of all the sources, means may be provided for producing a unidirectional control voltage proportional to the frequency of the oscillator. This may be accomplished by means of a filter circuit 60 comprising a condenser 61 connected across a suitable source of direct current, such as the battery 62, in series circuit relation with a control resistor 64, and a control valve 65 which may be of the gaseous type. Means such as the control valve 66 may be provided in shunt circuit relation with the condenser 61 for effecting discharge thereof.

By connecting the control electrodes 68 and 69 of the control valves 65 and 66 to the terminals of a voltage divider 70, which may be connected across the secondary winding of a transformer 72, of which the primary winding 73 may be connected in the discharge circuit of the oscillator condenser 22, and providing control of the valves 65 and 66 may be effected so as to charge and discharge the condenser 61 in accordance with the frequency of the impulses produced by the oscillator. Means such as the battery 71 may be connected between the cathode of the valve 66 and an intermediate point of the divider 70 to bias the valve 66. Accordingly, with the valves 65 and 66 charging and discharging the condenser 61 in response to positive and negative portions of the voltage wave from the transformer 72, a voltage will appear across the control resistor 64 which is proportional to the frequency of the oscillator.

By connecting the control resistor 64 in series circuit relation with the outputs of the thermal converters 42 and the impulse filters 50, but in opposed relation thereto, a voltage may be applied to the galvanometer device 37 which is the differential between the voltage proportional to the frequency of the oscillator and the voltage which is proportional to the totalized rates of power flow in the local and remote sources. Operation of the oscillator may thus be effected so as to produce an impulse frequency for transmission over the telemetering channel 11 which is proportional to the totalized rates of power flow of the sources from which indications are received and which is independent of variations in the galvanometer device and of the oscillator valve device.

While the frequency of the oscillator 21 is proportional to the totalized indications from the remote and local circuits, the differential voltage applied to the galvanometer device 37 is zero and the illumination of the photosensitive devices 34 and 35 is balanced, so that the frequency of the oscillator is unaffected. Should the totalized indication from the circuits increase, a differential voltage would be applied to the galvanometer device 37 causing it to increase the illumination of the photosensitive device 34 and decrease that of the device 35. The charge on the condenser 30, therefore, increases, increasing the positive bias potential on the control electrode 28 of the valve 24. The rate of charge of the condenser 22 increases, thus increasing the frequency of its discharge through the valve 26. The frequency of the oscillator 21 is thus increased. The voltage produced by the filter 60 increases accordingly, and when the frequency of the oscillator is proportional to the total indications the differential voltage becomes zero. The charging rate of the condenser 30 is then reduced, but the charge remains at an increased value, holding the frequency of the oscillator until some further departure of the oscillator frequency from the proper value relative to the totalized indication.

Referring to the modification of the invention shown in Fig. 2, the reference numeral 74 may denote, generally, a telemetering repeater for use in repeating a totalized indication of the rates of power flow or other electrical quantities in a plurality of local circuits represented by the conductors 13, 14 and 15, respectively. The power sources may be provided with thermal converters 42 of the type described in connection with Fig. 1 for producing unidirectional control voltages which are proportional to the individual rates of power flow or other electrical quantities in their associated power circuits.

In order to provide for transmitting over the telemetering channel 11, impulses at frequencies which are proportional, for example, to the totalized rates of power flow in the sources represented by the conductors 13, 14 and 15, a repeater oscillator 21 may be provided as in the system of Fig. 1, comprising a condenser 22 which may be charged from a suitable source of direct-current energy, such as the battery 23, through a control valve 24, and discharged through a valve 26 and the primary winding 73 of a transformer 72 which is coupled to the telemetering channel 11. Means such as the filter circuit 60, which is described in detail in connection with the system of Fig. 1, may be used for producing a unidirectional control voltage across the control resistor 64, which is proportional to the frequency of the oscillator 21.

In order to provide for controlling the frequency of the oscillator 21, means such as the direct-current voltage amplifier 75 may be provided for amplifying the differential between the control voltage produced by the impulse filter 60 and the sum of the control voltages produced by the thermal converters 42. The amplifier may comprise a pair of valve devices 76 and 77 connected in series circuit relation with a source of direct-current voltage such as the battery 78, and the adjoining sections 79 and 80 of an output voltage divider 81. A stabilizing condenser 82 may be connected across the input circuit of the amplifier. The amplified control voltage may be used to control the conductivity of the valve device 24 by applying it to the control electrodes 83 and 84 of a pair of control valves 85 and 86 which operate respectively to charge and discharge a control condenser 87. A voltage divider 88 is connected between the control electrodes for normally applying a bias control voltage thereto from a battery 89

By connecting the control condenser 87 in the control electrode circuit of the control valve 24 the conductivity of the valve, and, hence, the rate of charge of the condenser 22 of the oscillator 21 from the battery 23 may be controlled. Thus, the frequency of the oscillator and the frequency of the impulses transmitted to the telemetering channel 11 may be accurately controlled in accordance with the totalized rates of power flow in the sources represented by the conductors 13, 14 and 15.

As hereinbefore described in connection with the system shown in Fig. 1, should the frequency of the oscillator 21 and the totalized indications from the several circuits not be proportional, a differential voltage of one polarity or the other, depending on the direction of departure, will be applied to the amplifier 75 across the input condenser. This voltage is amplified and applied to the valves 85 and 86. Should the frequency of the oscillator be high, the polarity of the differential voltage will be reversed and the valve 86 will be made more conductive, reducing the charge on the condenser 87, and accordingly, lowering the frequency of the oscillator until a balancing condition is reached.

From the above description and the accompanying drawing, it will be apparent that I have provided in a simple and effective manner for totalizing and repeating indications of the electrical conditions or quantities in not only a plurality of local sources, but also of local and remote sources. Since control of the repeater oscillator is effected by a differential control voltage which depends on both the totalized indications and the actual frequency of the oscillator, it operates as a zero balance system, thus eliminating errors in accuracy due to any shift in the impulse rate which might be caused by leakage from the oscillator control condenser or from any variable characteristics of the oscillator tube. As a result, an accurate and reliable indication of the totalized indications is produced.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. An impulse repeater for totalizing impulses from a plurality of circuits comprising, an oscillator for producing impulses, an impulse filter for producing a control voltage proportional to the frequency of the oscillator impulses, means for producing an additional control voltage proportional to the totalized sum of the impulses to be repeated, and means for controlling the frequency of the oscillator in accordance with the differential between the control voltages.

2. An impulse repeater for providing an impulse rate proportional to the totalized electrical energies of a plurality of sources comprising, means producing unidirectional control voltages proportional to the electrical energies of the several sources, an oscillator controllable to produce impulses at different frequencies, means producing a unidirectional control voltage proportional to the frequency of the oscillator, and means for controlling the frequency of the oscillator in accordance with the differential between the sum of the control voltages proportional to the energies of the several sources and the control voltage proportional to the output frequency of the oscillator.

3. For use in a telemetering system with one or more sources of electric power having means for producing unidirectional control voltages dependent on the rate of flow of power at the different sources, an oscillator controllable to produce different frequencies of impulses for transmission over a telemetering line, means for producing a unidirectional control voltage dependent on the frequency of impulses produced by the oscillator, and circuits means for controlling the oscillator in accordance with the differential between the totalized sum of the several control voltages from the sources of power and the control voltage proportional to the frequency of the generator.

4. A telemetering system for transmitting a totalized indication of the rate of power flow of one or more local sources and one or more remote sources having impulse transmitting means for transmitting a plurality of impulses at a frequency dependent on the rate of flow of power from said sources comprising, impulse filter means for each of the sources for producing variable unidirectional control voltages dependent on the frequency of the impulses, thermal converter means for producing a unidirectional control voltage proportional to the rate of flow of power in the local sources, an oscillator additional impulse filter means for producing a unidirectional control voltage proportional to the frequency of the oscillator and circuit means for controlling the frequency of the amplifier in accordance with the differential between the totalized sum of the unidirectional control voltages from the impulse filter means and the thermal converters and the unidirectional control voltage from the additional impulse filter means, whereby the frequency of the oscillator is proportioned to the totalized rate of power flow from the several sources.

5. For use in a telemetering system for transmitting a totalized indication of the rate of flow of electrical energy at several locations, means for producing control voltages proportional to the rates of flow of energy at each of the several locations, an oscillator for producing impulses to be transmitted, means including a pair of radiation responsive devices connected for controlling the frequency of the impulses, an impulse filter for producing a direct-current control voltage proportional to the frequency of the impulses produced by the oscillator, and means for varying the radiation responsive device in accordance with the differential between the sum of the control voltages proportional to the rate of flow of energy at the several sources and the control voltage proportional to the frequency of the oscillator to maintain the frequency proportional to the totalized flow of energy at the several locations.

6. A telemetering repeater for use in a telemetering system for transmitting totalized indication of the rate of electrical energy at a local source and at a remote source having impulse transmitting means for transmitting from the remote source a plurality of impulses at a frequency dependent on the rate of flow of power at the remote source comprising, thermal converter means connected to the local source for producing a unidirectional control voltage proportional to the rate of flow of electrical energy at the local source, impulse filter means for producing a unidirectional control voltage proportional to the frequency of the impulses transmitted from the remote source, a local oscillator for producing impulses for transmission to a remote metering station, impulse filter means for producing a unidirectional voltage proportional to the frequency of the impulses transmitted to the remote metering station, and means for varying the frequency of the impulses transmitted including a pair of photosensitive devices for varying the frequency of the local oscillator in opposite directions, a source of light, and a galvanometer for varying the amount of light from the source on the photosensitive devices in accordance with the differential between the sum of the control voltages from the converter means and filter means associated with the remote source impulse transmitting means, and the voltage from the impulse filter means associated with the remote source impulse transmitting means, and the voltage from the impulse filter means associated with the local oscillator.

7. A repeater for an impulse telemetering system having a plurality of impulse transmitters at remote stations for transmitting impulses to a repeater station at frequencies dependent on the rate of flow of electrical power at the remote stations, a repeater oscillator for transmitting impulses to a remote metering station, means at the repeater station for producing unidirectional control voltages dependent on the frequencies of the impulses, additional means for producing a control voltage proportional to the frequency of the impulses produced by the oscillator, and means for controlling the frequency of the oscillator impulses in accordance with the differential between the totalized sum of the voltages proportional to the frequencies of the impulses from the remote stations and the voltage proportional to the frequency of the oscillator, whereby the frequency of the oscillator equals the totalized frequencies of the impulses from the remote stations.

8. An impulse repeater for repeating totalized indications of the power flow in a plurality of circuits comprising, an electronic oscillator for producing impulses at different frequencies, an impulse filter for producing a unidirectional control voltage proportional to the frequency of the oscillator, thermal converter means for producing unidirectional control voltages proportional to the power flow in each of the plurality of circuits, and means for controlling the frequency of the oscillator in accordance with the totalized power in the plurality of circuits including an amplifier responsive to the differential between the sum of the control voltages of the thermal converter means and the voltage of the impulse filter and circuit means controlling the frequency of the oscillator in accordance with the output of the amplifier.

9. An impulse repeater for a plurality of electrical circuits comprising, an oscillator including a condenser, a glow discharge valve connected in parallel circuit relation with the condenser, and a control valve connected in series relation with the condenser and a source of direct current and having a control electrode for controlling the rate of charge of the condenser, an impulse filter circuit coupled to the oscillator for producing a unidirectional control voltage proportional to the frequency of the oscillator, means for producing unidirectional control voltages proportional to the power flow in each of the plurality of circuits, and means including a pair of electric valves selectively controlled in accordance with the differential between the sum of the control voltages of the plurality of circuits and the voltage of the filter circuit to vary the charge on a condenser connected in the control electrode circuit of the oscillator control valve for controlling the frequency of the oscillator in accordance with the totalized power flow in the plurality of circuits.

10. A telemetering impulse repeater for totalizing the impulse indications from a plurality of remote stations with indications from a plurality of thermal converters associated with local power circuits for producing unidirectional control voltages proportional to the power flow on said circuits comprising, an oscillator including a condenser having a glow discharge valve connected in shunt circuit relation therewith, and having a frequency control valve connected in series circuit relation therewith with a control electrode for controlling the charging rate of the condenser, impulse filter means coupled with the oscillator for producing a control voltage proportional to the frequency thereof, additional filter means for producing control voltages having the same proportionality to the frequency of the impulse indications from the remote station, and means responsive to the differential between the voltage of the filter means and the sum of the voltages of the additional filter means.

CARL OMAN.